Patented Jan. 10, 1950

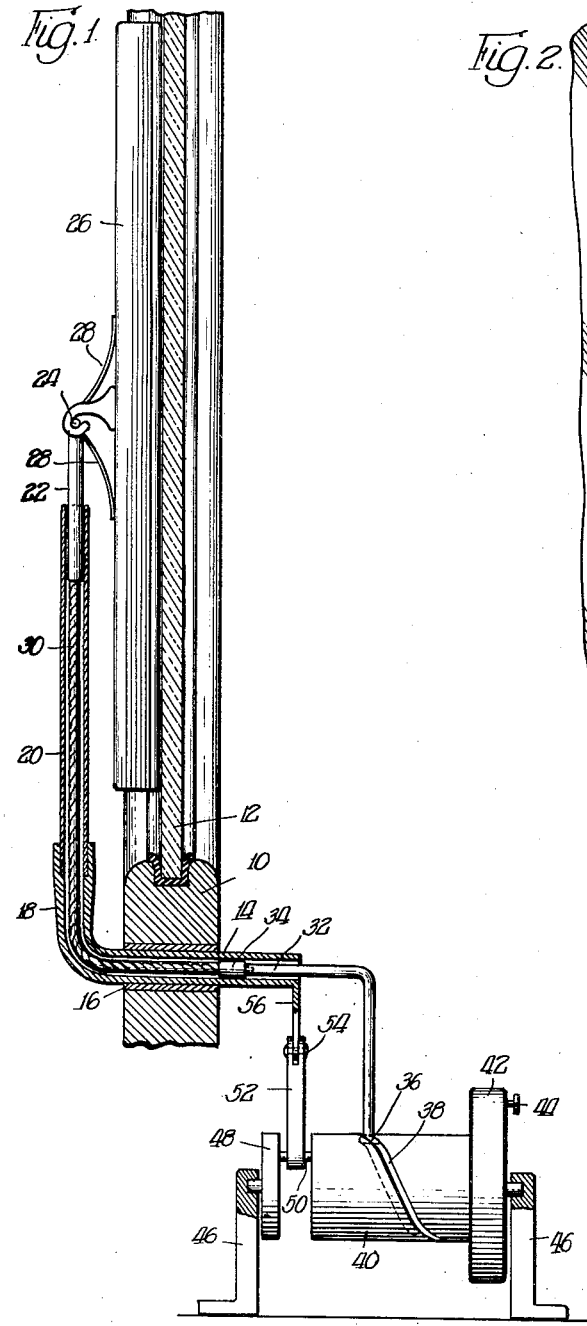
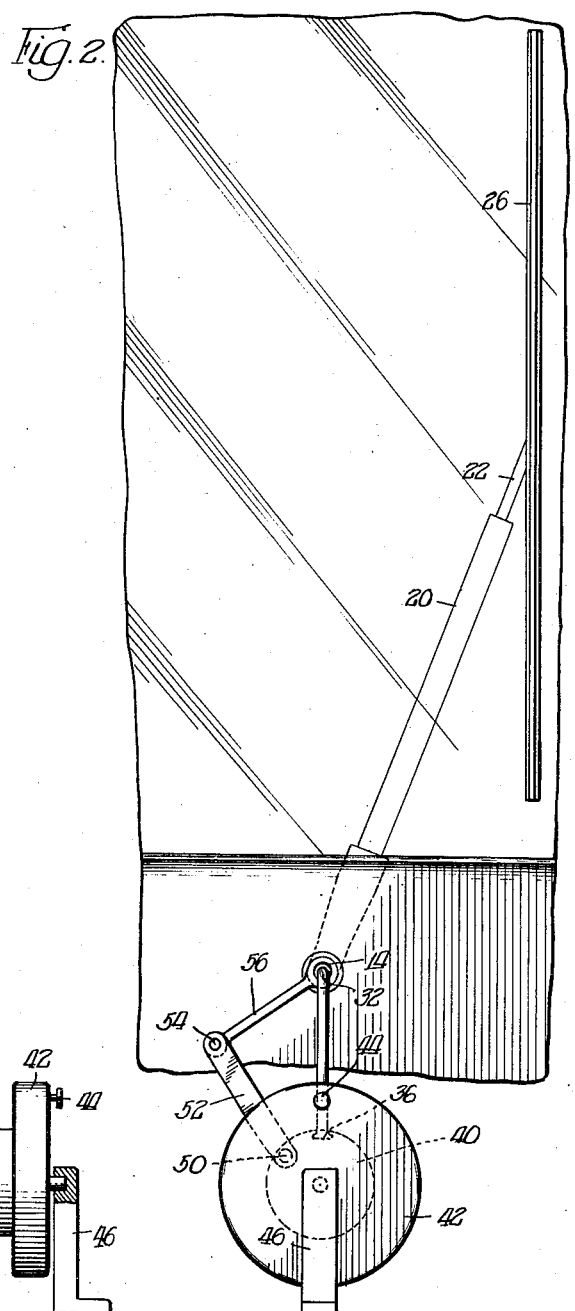

2,494,408

UNITED STATES PATENT OFFICE 2,494,408

WIPER MECHANISM

Harry Edgar Rice, Jr., Urbana, Ohio

Application January 28, 1944, Serial No. 519,995

2 Claims. (Cl. 15—255)

This invention pertains to wiper mechanism.

In the form of wiper mechanism in use today, particularly on vehicles such as automobiles, airplanes and the like, the windshield wiper is moved in an arc, which is constant. This then only cleans arcuately a fixed portion of the windshield. There have been other types of windshield wipers provided, such as those moving in a straight line, but there again the area cleaned is fixed, the width thereof being determined by the width of the blade of the wiper and the mechanism therefor is bulky and expensive.

It is, therefore, an object of this invention to provide a wiper for a windshield, and the like, wherein the blade of the wiper will clean a substantial area of the windshield, though the operating means therefor moves in a restricted arc.

Another object of the invention is to provide wiper mechanism which is inexpensive to make and maintain, is compact and readily adapted for use in place of the ordinary wipers now in use.

Another object of the invention is to provide wiper mechanism wherein the operating means moves in a restricted path but wherein the cleaning blade moves over a wide area.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary sectional side elevation of a form of windshield wiper mechanism embodying the invention; and, Figure 2 is a fragmentary elevation of the windshield wiper mechanism illustrated in Figure 1 looking toward the left as viewed in said Figure 1.

In the construction illustrated, the sill or frame 10 supports the windshield or glass 12. The windshield wiper comprises the hollow or tubular bearing member 14 extending from the inside of the glass 12 through the sill 10, being supported in the bearing 16. The bearing member 14, on the outside of said glass, is provided with the upwardly extending arm 18 supporting the tubular arm 20 secured thereto. The plunger member 22 having a substantially snug sliding fit in the arm 20 extends outwardly of said arm and is pivoted as at 24 to the windshield wiper blade 26 engaging the outside of the glass 12, being urged toward said glass by means such as the spring member 28.

The inner end of the plunger 22 is connected to the flexible member 30 which may be in the form of a cable, Bowden wire or other means, the other end of said flexible member being connected to the cam follower member 32. The follower member 32 is provided with the snug bearing member 34 permitting, however, relative sliding movement between the follower member and the bearing member 14 and said cam member is provided with a cam follower 36 engaging the cam track 38 of the cam member 40.

The cam member 40 is adapted to be rotated by means of the motor 42 provided with the control 44. The motor may be of the exhaust type, electric type, etc., and is supported in the frame 46 in which the crank 48 is pivoted. The crank 48 is also provided with the crank pin 50 for rotating said crank, the crank pin being pivotally connected to the link 52 which is pivoted as at 54 to the arm 56 of the bearing member 14.

As shown in Figures 1 and 2 the cam track 38 is so formed that when arm 20 has been oscillated to the limit of its stroke in a right hand direction, member 32 will be located in its innermost position with 22 and the wiper 26 being extended the maximum extent. At the other extreme left hand position of arm 20 member 32 will be in its outermost position with 22 and the wiper 26 retracted. It is of course possible to change the contour of the cam track so that the wiper will be retracted when arm 20 is vertical and extended when arm 20 is at either of its extreme positions. The cam track between the two extreme points may then be made gradual so that the blade of the wiper will move in a manner to conform to the shape of the windshield, that is, rectilinearly.

It will thus be seen that by initiating operation of motor 42, by operation of the control 44, the cam member 40 is rotated causing the crank pin 50 to move link 52 to cause oscillation of arm 56 and consequently oscillation of the blade 26. Rotation of the cam 40 will cause the follower 32 to reciprocate to cause inward and outward movement of the member 22 and a similar movement of the blade 26. It is, of course, appreciated that the motor 42 may be synchronized with other motors to operate wipers for completely cleaning a windshield, or the motor 42 may drive simultaneously other cams 40, cranks 48 and other wipers.

It is to be understood that I do not wish to be limited by the exact embodiments of the device shown, which are merely by way of illustration and not limitation, as various and other forms of the device will, of course, be apparent to those skilled in the art without departing from the spirit of the invention or the scope of the claims.

I claim:

1. In wiper mechanism adapted to wipe a substantially flat surface, a hollow arm including an elongated portion and a right angled bearing portion with a curved section between and connecting the portions, said elongated portion of the arm extending substantially parallel to and in spaced relation with said flat surface and said bearing portion journalling the arm for oscillating movement, operating means connecting with said bearing portion for oscillating the arm, a slidable member in the hollow arm projecting from the elongated portion and also projecting from the bearing portion, a wiper pivotally connected to the end of the member projecting from the elongated portion, and a movable cam member driven by said operating means and connecting with the end of the slidable member projecting from the bearing portion, whereby slidable movement may be imparted to the member during oscillating movement of the arm to move the wiper bodily with respect to the arm.

2. In a wiper mechanism adapted to wipe a substantially flat surface, a hollow arm including an elongated portion and a right angled bearing portion for journalling the same, said elongated portion of the arm extending substantially parallel to and in spaced relation with said flat surface, a slidable member in the hollow arm projecting from the elongated portion on one side of said surface and projecting from the bearing portion on the other side of said surface, a wiper pivotally connected to the end of the member projecting from the elongated portion, and rotatable means operatively connected to said bearing portion and to the end of the member projecting therefrom for simultaneously imparting an oscillating movement to said bearing portion and a reciprocating motion to said slidable member.

HARRY EDGAR RICE, Jr.

REFERENCES CITED

The following references are of record in the file of this patent:

UNITED STATES PATENTS

| Number | Name | Date |
|---|---|---|
| 624,843 | Mitchell | May 9, 1899 |
| 1,283,914 | Rodow | Nov. 5, 1918 |
| 1,660,971 | Lindner | Feb. 28, 1928 |
| 1,725,258 | Doner | Aug. 20, 1929 |
| 2,079,399 | Drew et al. | May 4, 1937 |
| 2,326,231 | Kraemer | Aug. 10, 1943 |
| 2,356,424 | Paton | Aug. 22, 1944 |